Figure 1:
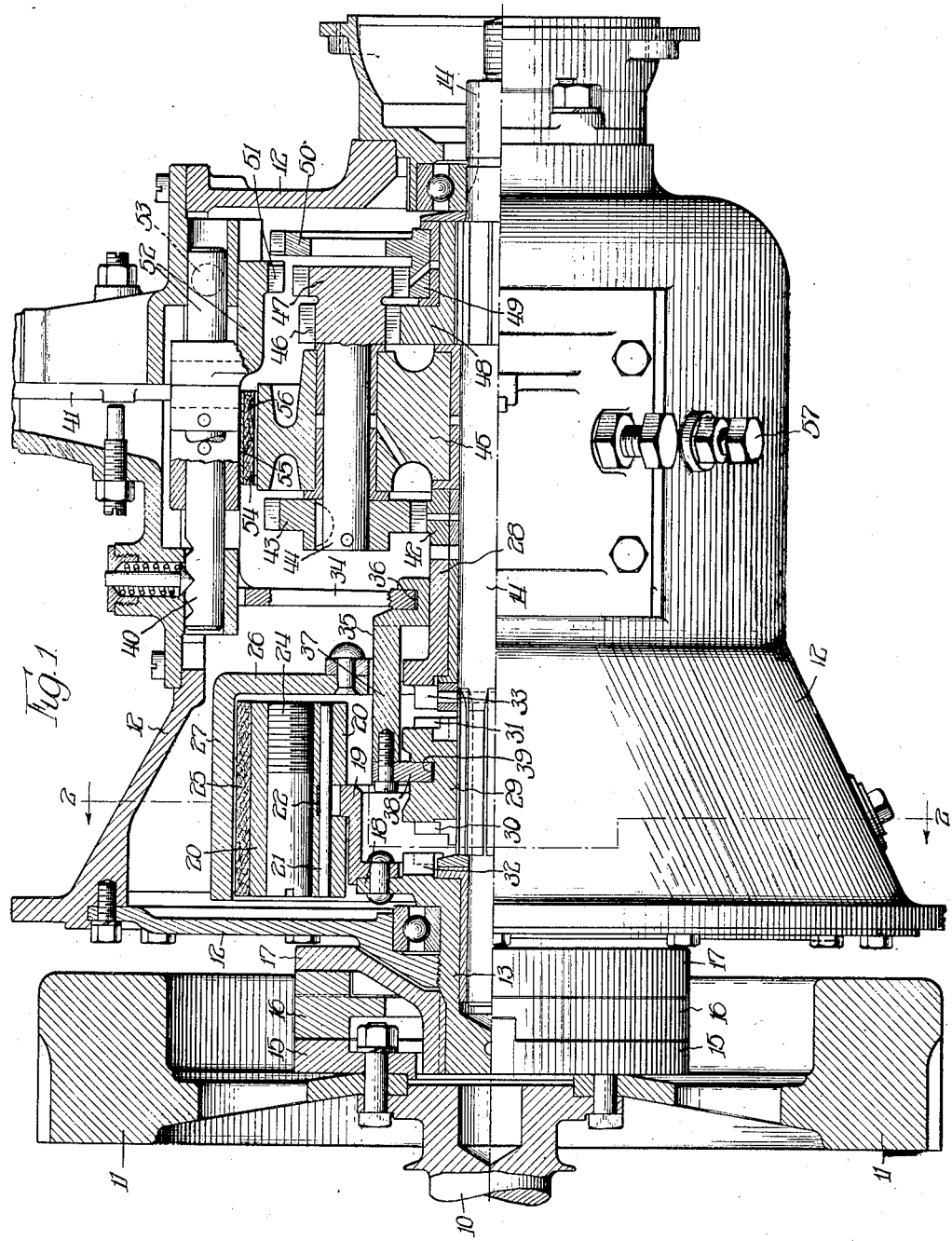

Sept. 10, 1929.　　W. E. JOHNSON　　1,727,467
FLEXIBLE AUTOMATIC TRANSMISSION
Original Filed April 26, 1922　　2 Sheets-Sheet 1

Witness:
A. Burkhardt.

Inventor:
William E. Johnson,
By Cromwell, Greist & Warden
Attys.

Sept. 10, 1929.  W. E. JOHNSON  1,727,467
FLEXIBLE AUTOMATIC TRANSMISSION
Original Filed April 26, 1922  2 Sheets-Sheet 2

Witness:
A. Burkhardt

Inventor:
William E. Johnson,
By Cromwell, Greist, Warden
attys.

Patented Sept. 10, 1929.

1,727,467

UNITED STATES PATENT OFFICE.

WILLIAM E. JOHNSON, OF CHICAGO, ILLINOIS, ASSIGNOR TO FLEXO-DRIVE CORPORATION, OF CHICAGO, ILLINOIS, A CORPORATION OF ILLINOIS.

FLEXIBLE AUTOMATIC TRANSMISSION.

Application filed April 26, 1922, Serial No. 556,667. Renewed January 25, 1929.

The present invention relates to power transmitting mechanism, and more particularly has to do with an improved flexible transmission.

The main and primary object of the invention resides in the provision of an improved flexible automatic transmission for vehicles which is characterized by the incorporation therein of readily controllable means for effecting, selectively, a flexible automatic drive, a rigid forward drive, a reduced forward drive, a reduced reverse drive or a neutral disconnection.

While the foregoing statements are indicative in a general way of the nature of the present invention, other objects and advantages not herein specifically referred to will be obvious upon a full understanding of the construction, arrangement and operation of the transmission.

Although the present disclosure is limited to one particular embodiment of the invention, it will be appreciated that this construction is chosen primarily for the purpose of exemplification and that the invention is capable of embodiment in other slightly modified forms which would fall clearly within the scope of the invention as defined by the appended claims.

In the drawings—

Figure 2:
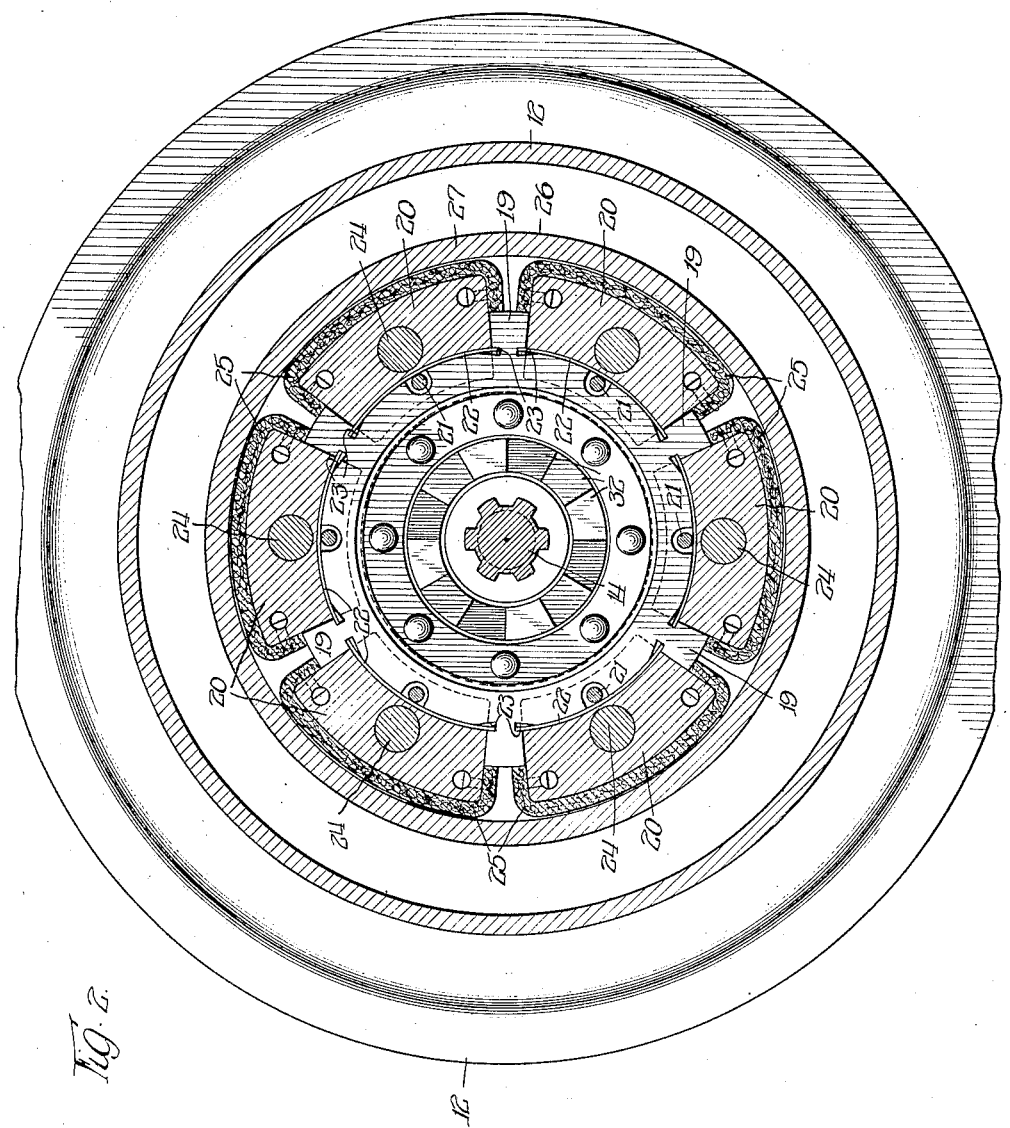

Fig. 1 is a composite view of the transmission showing the upper half of the same in vertical longitudinal section and the lower half of the same in side elevation; and Fig. 2 is a vertical transverse section on the line 2—2 of Fig. 1.

Reference now being had with more detail to the drawings, it will be noted that the numeral 10 designates the rear end of a vehicle motor crank shaft to which is secured a fly wheel 11. A casing 12, which is disposed at the rear of the fly wheel 11, encloses the transmission of this invention and is provided at its ends with bearings in which a driving element 13 and a driven element 14 are journalled in axial alignment with the aforementioned crank shaft 10. The driving element 13 is, in substance, the prime mover of the power train, being mounted for synchronous rotation with the crank shaft 10 through the introduction therebetween of a universal coupling consisting of a driving flange 15, an intermediate flange 16, and a driven flange 17. The driven element 14 is the load-carrying member of the power train, and has its front end reduced and rotatably journalled in a bearing recess in the rear end of the driving element.

The driving element 13 is formed as a stub shaft with a radial flange 18 at its rear end. This flange has rigidly secured thereto an annular weight spider 19 which is recessed at regular intervals about its periphery to receive a plurality of weight members 20, as shown in Fig. 2. The shaping of the weight seating recesses in the weight spider is such as to permit shifting of the weight members radially away from the axis of the transmission under centrifugal force generated by synchronous rotation of the spider with the prime mover. It is to be understood that the weight spider 19 may be, in some embodiments of the invention, carried directly by the fly wheel 11 without having any detrimental effect upon the operation of the transmission. Each of the weight members 20 is grooved along its inner edge to straddle the spider inwardly of the recess therein, and is provided, centrally of the groove, with a transverse pin 21 which passes through a relieved portion in the bottom of the recess and bears outwardly against the medial portion of a bowed spring 22 carried at its ends in notches 23 formed in the sides of the weight seating recess. The notches 23 are so shaped as to permit freely further bowing of the spring carried at its ends therein when centrifugal force tending to move the weight outwardly overcomes the strength of the spring and forces the same to yield outwardly. The spring 22 is however sufficiently strong to hold the weights inwardly until a predetermined minimum amount of centrifugal force has been generated by the rotation of the prime mover. Each of the weight members is preferably provided with an aperture in which a weight plug 24 is removably inserted for varying the aggregate centrifugal force generated at any speed of rotation of the prime mover. It will be appreciated that, by removing certain of these plugs and leaving others, minute variations through a wide range may be effected. Each of the weight members is also preferably provided with a fabric friction covering 25 on its outer bearing surface for a purpose hereinafter apparent.

Upon being shifted away from the axis of the prime mover under centrifugal force the weight members 20 are adapted to contact with a drum 26 which is characterized by a weight-encompassing band portion 27 and a rearwardly disposed sleeve portion 28 rotatably journalled on the driven element 14. Selectively variable means for connecting the drum 26 with the driven element 14 are provided and will now be described.

A collar 29 is splined on the driven element 14 between the weight spider and the drum. The collar is provided with jaw clutch elements 30 and 31, respectively located on its front and rear faces, and is shiftable axially along the driven element to effect, when shifted forwardly, a rigid connection of the driven element with the driving element through a jaw element 32 on the rear face thereof, and, when shifted rearwardly, a rigid connection of the driven element with the drum through a jaw clutch element 33 on the front face thereof. The collar 29 is moved axially along the driven element by means of a shifting fork 34 which is disposed exteriorly of the drum. Fork 34 is connected with the collar by means of a bracket 35 which is provided, on its rear end, with an annular groove 36 in which the fork rides, and, on its front end with angularly spaced arms 37 which pass through apertures in the drum and connect, interiorly thereof, with a shifting annulus 38 mounted for rotation in a groove 39 in the collar. The fork 34 is in turn rigidly secured to a longitudinally movable rod 40 which is manually shiftable in either direction through the operation of a universal shift lever 41. The clutch collar 29 is shown in the drawings as in its neutral position.

A ring gear 42 is secured to the drum at the rear end of the sleeve portion 28 thereof, and meshes outwardly with two planet gears 43 which are secured to the front ends of two planet gear shafts 44 disposed diametrically on opposite sides of the driven element 14. The shafts 44 are rotatably journalled in a gear spider 45 which is in turn rotatably journalled on the driven element. Each of the shafts 44 is provided at its rear end with both a small planet gear 46 and a large planet gear 47. The small planet gears 46 mesh inwardly with a gear 48 which is splined to the driven element 14, and the large planet gears 47 mesh inwardly with a ring gear 49 which is rotatably journalled on a sleeve extending rearwardly from the gear 48. The ring gear 49 has rigidly associated therewith a large gear 50 into the teeth of which the teeth 51 of a lock bar 52 are adapted to move. The bar 52 is mounted for longitudinal movement in the top of the casing in parallel spaced relation to the rod 40, and is shiftable into or out of locked engagement with the gear 50 through the operation of the universal shift lever 41 which also controls, as stated, the movement of the rod 40. Means 53 of a well known character serve to prevent any movement of either of the members 40 or 52 by the shift lever 41 unless the other of said members is in its neutral non-operative position. The gear spider 45 is formed with an outer cylindrical periphery 54 on which a brake band 55 is adapted to engage through its friction lining 56 when the band is constricted about the spider through the manipulation of a lever not shown. The band 55 is prevented from hanging on the spider when not in operation by set screws 57 or any other suitable means which are capable of elevating the bottom of the band.

The operation of the transmission will now be described. When the clutch collar is shifted rearwardly to effect a rigid connection between the drum 26 and the driven element, a flexible transmission is produced in which the ratio of power transmission is automatically adjusted between the driving and driven elements to handle most efficiently the load resistance. As the driving element rotates the weight members are thrown outwardly under centrifugal force into frictional sliding engagement with the drum. If the speed of rotation of the driving element is sufficient and the load resistance is not too great, the action of the weight members on the drum will start the latter to rotating at a progressively increasing speed until the speed of the drum equals the speed of the weight members and a relatively stationary condition exists therebetween. Upon the load resistance increasing from whatever cause beyond the maximum limit of the transmission at that speed of the driving element, a slippage will occur between the drum and weight members until the friction set up by such slippage is sufficient in proportion to the increased load to prevent further slippage and maintain the reduced ratio of power transmission thus set up. Upon the load resistance now decreasing the friction set up by the slippage will serve to increase the speed of the drum until it again equals that of the weight members.

When the driving element is stationary or is rotating very slowly at which is commonly termed an "idling speed", the weight members are held inwardly from contact with the drum by means of the springs 22. As the speed of the prime mover increases above an idling speed the springs 22 yield and the flexible transmission comes into operation, providing of course that the clutch collar is set to effect, as stated, a rigid connection between the drum and the driven element. Under some circumstances it is desirable to produce a rigid one to one drive between the driving and the driven elements. To effect this the clutch collar may be shifted forwardly to connect these elements rigidly, thereby rendering the flexible portion of the transmission inoperative.

It is desirable at times to produce a reduced forward drive ratio between the driving and the driven elements. To effect this the brake band 55 is constricted on the gear spider to hold the latter against rotation relative to the transmission casing, the clutch collar 29 of course being in its neutral position. When the gear spider is thus held, the drum 26, upon being rotated by the action thereon of the weights 20, rotates the planet gear shafts 44 through the gears 42 and 43. The shafts 44 in turn rotate the planet gears 46 which mesh with and rotate the gear 48 and consequently the driven element 14 to which the gear 48 is secured. Through the difference in diameter between the planet gears 43 and 46 a substantial reduction in the ratio of power transmission is effected between the driving and the driven elements.

In order to effect a reduced reverse drive through the transmission the lock bar 52 through the shift lever 41 is moved into a position where its teeth 51 mesh with the teeth of the gear 50 and accordingly lock the latter against rotation relative to the casing. Such a locking of the gear 50 and consequently of the gear 49 with which the gear 50 is rigidly associated serves to force the gear spider 45 to rotate in an opposite direction to the rotation of the drum 26 when the latter is rotated through the weight members 20, since the planet gears 47 are caused to travel in a stationary gear track provided by the ring gear 49. The difference in the diameter of the planet gears 43 and 47 permit this backward rotation of the spider. During this rotation of the spider the planet gears 46 which are in mesh with the gear 48 secured to the driven shaft drag, in effect, the driven element 14 and cause the same to rotate in a reverse direction. If the planet gears 46 were of the same size as the planet gears 47 the driven element 14 would be held stationary like the gear 49, but the difference in the sizes of these gears serves to effect the reverse rotation of the driven element, the reduced ratio in reverse being determined by the relative sizes of the planet gears 46 and 47.

I claim:

1. In a flexible power transmission, a rotary prime mover, a rotary load-carrying driven element, members connected with the prime mover and shiftable away from the axis thereof under centrifugal force, a drum against which the members are adapted to exert pressure, means for connecting the drum with the driven element, and means operable at will while the transmission is either stationary or in motion for effecting a rigid connection between the prime mover and the driven element to render inoperative the flexible connection existing therebetween through the members and the drum.

2. In a flexible power transmission, a rotary prime mover, a rotary load-carrying driven element, members connected with the prime mover and shiftable away from the axis thereof under centrifugal force, a drum against which the members are adapted to exert pressure, means for connecting the drum with the driven element, and a jaw clutch for effecting at will a rigid connection between the prime mover and the driven element to render inoperative the flexible connection existing therebetween through the members and the drum.

3. In a flexible power transmission, a rotary prime mover, a rotary load-carrying driven element, weight members mounted for synchronous rotation with the prime mover and shiftable radially away from the axis thereof under centrifugal force, a drum against which the members are adapted to exert outward pressure, and means for optionally connecting either the drum or the prime mover with the driven element.

4. In a flexible power transmission, a rotary prime mover, a rotary load-carrying driven element, weight members mounted for synchronous rotation with the prime mover and shiftable radially away from the axis thereof under centrifugal force, a drum against which the members are adapted to engage frictionally under outward pressure, means to effect a reduced torque transmitting connection between the drum and the driven element, and means to render said connection inoperative and effect in lieu thereof a direct torque transmitting connection between the prime mover and driven element.

In testimony whereof I have hereunto signed my name.

WILLIAM E. JOHNSON.